Figure 1:
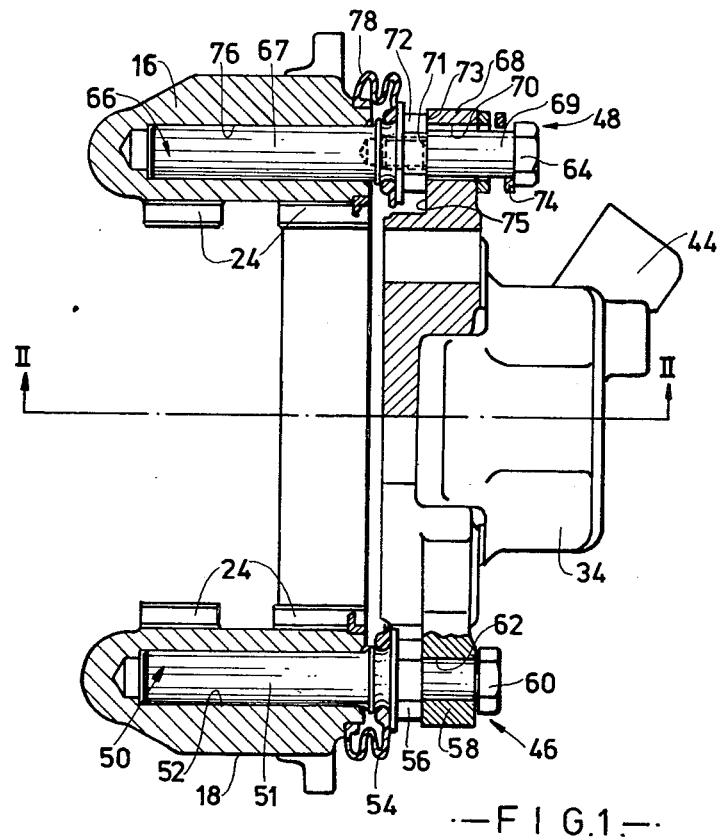

United States Patent [19]

Baum

[11] 4,121,698
[45] Oct. 24, 1978

[54] SLIDING CALIPER DISC BRAKE

[75] Inventor: Heinz Willi Baum, Dudweiler, Fed. Rep. of Germany

[73] Assignee: Girling Limited, Birmingham, England

[21] Appl. No.: 801,919

[22] Filed: May 31, 1977

[30] Foreign Application Priority Data

Jun. 1, 1976 [GB] United Kingdom ............... 22498/76

[51] Int. Cl.² ..................... F16D 65/02; F16D 55/224
[52] U.S. Cl. .................................................. 188/73.3
[58] Field of Search .................... 188/71.1, 73.4, 73.3, 188/72.4

[56] References Cited

U.S. PATENT DOCUMENTS

| 3,682,277 | 8/1972 | Brown | 188/73.3 |
| 3,735,843 | 5/1973 | Wiig | 188/71.1 X |

FOREIGN PATENT DOCUMENTS

| 2,510,036 | 9/1975 | Fed. Rep. of Germany | 188/73.3 |
| 2,229,290 | 6/1974 | France | 188/73.3 |

Primary Examiner—George E. A. Halvosa
Attorney, Agent, or Firm—Scrivener, Parker, Scrivener & Clarke

[57] ABSTRACT

A sliding caliper disc brake comprises a torque member, a caliper member slidably mounted on the torque member for straddling a minor portion of the periphery of a rotatable disc, and an actuator for directly urging a friction pad against one side of the disc to cause the caliper member to slide relative to the torque member to apply by reaction an opposite friction pad onto the other side of the disc. The caliper member is slidably mounted on the torque member by a sliding connection which includes a pin element having a portion slidably received in one of the members. The latter pin element is connected to the other of the members by an arrangement which permits lateral displacement of the pin element with respect to the other of the members. Laterally extending friction surfaces are provided on the pin element and on the other of the members. The latter friction surfaces are axially biased towards each other so as to provide frictional resistance to the aforegoing lateral displacement.

6 Claims, 2 Drawing Figures

SLIDING CALIPER DISC BRAKE

The present invention relates to sliding caliper disc brakes of the type in which a caliper member, which is slidably mounted on a torque member and straddles a minor portion of the periphery of a rotatable disc, includes an actuator for directly urging a friction pad onto one side of the disc whereupon the caliper slides relative to the torque member and applies by reaction an opposite pad to the other side of the disc.

When the sliding connection between the two members is provided by a pair of pins fixed with respect to one of the members and slidable in openings in the other of the members, increased resistance to sliding arising from corrosion and dirt may be avoided by sealing the sliding surfaces of the pins and their openings. However, it is imortant to ensure that the pins and openings are accurately aligned and parallel. Any appreciable deviation, which will typically be in the order of inaccuracies expected in mass-production manufacture, will affect the ease with which the caliper member will slide on the torque member resulting in uneven braking when, for example, two nominally identical brakes with different sliding characteristics are mounted at the front wheels of a vehicle. Many proposals have been made to overcome this problem including the provision of resilient members which accommodate such misalignment as may be present and the provision of multicomponent pins which are adjustable during brake assembly. The latter solution has been found to be most satisfactory but problems can arise during heavy braking from deflection of the torque member resulting in intermittent misalignment between the pins and openings. An object of the present invention described below is to reduce any increased resistance to sliding which this might cause.

It is also known to use an arrangement in which one of the pins, which is slidably received in a complementary opening in the torque member, is connected to the caliper member by way of a coupling which permits limited lateral displacement of the pin relative to the caliper member, the coupling comprising a bolt portion of the pin whose shank is surrounded by an annular resilient bush which is received in an oversized opening in the caliper. A disadvantage of this arrangement, however, is that when the bush has to be compressed to accommodate lateral displacement of the pin and housing, the internal forces within the bush exert a lateral force on the pin acting to increase the resistance to axial sliding of the pin in its complementary opening in the torque member. This resistance to axial sliding of the pin may be large and of an unpredictable magnitude.

According to the present invention, there is provided a sliding caliper disc brake comprising a torque member, a caliper member slidably mounted on the torque member for straddling a minor portion of the periphery of a rotatable disc, and an actuator for directly urging a friction pad against one side of the disc to cause the caliper member to slide relative to the torque member to apply by reaction an opposite friction pad onto the other side of the disc, the caliper member being slidably mounted on the torque member by a sliding connection which includes a pin element having a portion slidably received in one of said members, said pin element being connected to the other of said members by means permitting lateral displacement of said pin element with respect to said other of said members, laterally extending friction surfaces on the pin element and on said other of said members and means axially biasing said friction surfaces towards each other so as to provide frictional resistance to said lateral displacement.

The resistance to sliding will be frictional resistance rather than the resistance arising from deformation of the resilient bush in the case of the known arrangement discussed above; deformation that can give rise to changing resistance to lateral displacement over a period of use and can lead to failure of the resilient mounting.

In a preferred embodiment, the pin element comprises a first part carrying said portion which is slidably received in said one of the members and a second part in the form of a headed bolt which extends axially from one end of said first part and has a shank portion which extends through an oversized opening in a laterally projecting lug portion of said other of said members.

The bolt is preferably screw-threadedly attached to said one end of the first part of the pin element, the shank portion of the bolt being unthreaded and connected to the screw threaded portion by a shoulder serving to limit penetration of the bolt into said first part.

In one embodiment, said one end of the first part of said pin element defines said laterally extending friction surface on the pin element, and one side surface of said lug portion defines said laterally extending friction surface on said other of said members, said axial biasing means being effective between the other side surface of said lug portion and the head of said bolt to axially bias said laterally extending friction surfaces into frictional engagement.

In another embodiment, the head of the bolt defines said laterally extending friction surface on the pin element and one side surface of said lug portion defines said laterally extending friction surface on said other of said members, said axial biasing means being effective between said one end of the first part of the pin element and the other side surface of the lug portion to axially bias said laterally extending friction surfaces into frictional engagement.

Preferably, the axial biasing means comprises a helical coil spring. The spring therefore acts to resiliently urge together said laterally extending frictional surfaces with a force which determines the frictional resistance to relative lateral displacement between the pin element and said other member.

The friction pads are preferably mounted on the torque member so that drag experienced by the pads when they are applied to the rotating disc is transmitted directly to the torque member and does not apply a lateral load to the sliding connection between the caliper and torque members.

The sliding connection preferably includes a second pin element which is slidable in one of said members and which is secured to the other member against any appreciable lateral displacement relative thereto. Conveniently, the two pin elements, which may be cylindrical, are slidable in parallel openings in the same member, that is either the torque member or the caliper member.

The sliding surfaces of the or each pin element and its complementary opening are preferably protected against the ingress of dirt and moisture by sealing means which retain the pin in its opening even when the connection between the pin elements and said other member is partially or completely dismantled for the replacement of friction pads or other servicing.

Figure 2:
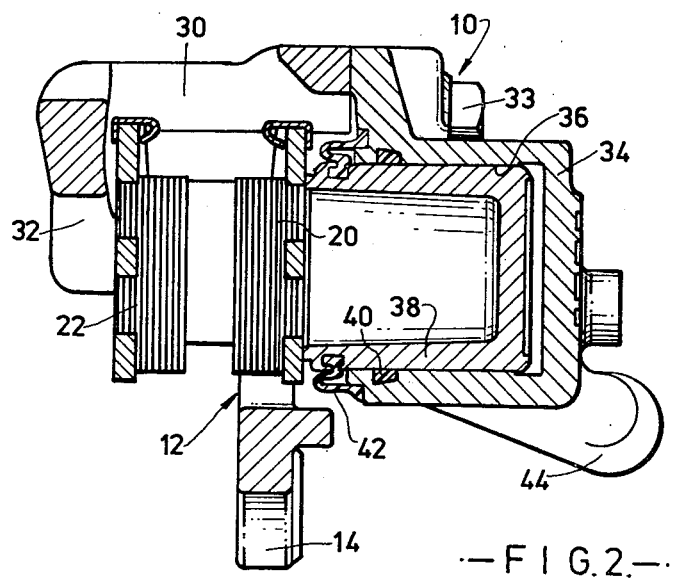

The invention is further described, by way of example, with reference to the accompanying drawings, in which:

FIG. 1 is a plan view, partly in section of a disc brake constructed in accordance with the invention with the pads and caliper bridge omitted for clarity, and FIG. 2 is a section on the line II—II in FIG. 1 through the complete disc brake.

The disc brake shown in the drawings comprises a caliper member generally designated 10 slidably mounted on a torque member generally designated 12 so as to straddle a minor portion of the periphery of a rotatable disc (not shown). The torque member 12 has a radially inwardly (of the disc) extending portion 14 by which the torque member 12 may be fixed to a vehicle. Alternatively the torque member may be an integral part of a vehicle component such as a suspension strut. A pair of torque member arms 16 and 18 extend over the disc and provide location for friction pads 20 and 22 (not shown in FIG. 1). For this purpose, each of the arms 16 and 18 is formed with a pair of rails 24 which slidably engage in correspondingly shaped side edges (not shown) of the back plates of the two pads 20 and 22. The two pads 20 and 22 are therefore mounted exclusively on the torque member so that circumferential drag forces experienced by the pads when the brake is applied are transmitted directly to one or other of the torque member arms 16 and 18 depending upon the direction of disc rotation.

The caliper member 10 is a generally U-shaped member comprising a bridge portion 30 carrying a front inwardly extending limb 32, and a rear inwardly extending limb portion 34 which is formed with a cylinder 36 in which a piston 38 is slidable. The bridge portion 30 with its front limb 32 is formed separately from the rear portion 34, the two portions being secured together by bolts 33 passing through holes (not shown) in the rear portion 34 into screw-threaded engagement with the bridge portion 30. The cylinder 36 carries a hydraulic seal 40. A resilient sealing boot 42 extends between the outer end of the piston 38 and the rear caliper limb. A feed port 44 for hydraulic fluid communicates with the interior of the cylinder 36. The piston 38 engages the back plate of the friction pad 20 and the front limb 32 of the caliper engages the other friction pad 22.

When hydraulic fluid under pressure is admitted into the cylinder 36 by way of the feed port 44, the piston 38 is displaced outwardly of the cylinder 36 and applies the pad 20, which is accordingly known as the directly actuated pad, against the adjacent side of the rotatable disc (not shown). The caliper is thereby caused to slide rearwardly with respect to the torque member 12 to apply the other pad 22, the indirectly actuated pad, to the other side of the disc.

The sliding connection between the caliper member 10 and torque member 12 comprises a pair of pin assemblies 46 and 48, one on each side of the brake. The pin assembly 46, which preferably is the trailing (that is, the pin is at that end of the brake from which the forwardly rotating disc emerges) pin assembly considered in the direction of normal rotation of the disc, comprises a pin element 50, a portion 51 of which is slidable in a complementary opening 52 in the torque member arm 18. The sliding surfaces of the pin and opening are sealed against the ingress of dirt and moisture by a flexible sealing boot 54 which also permanently retains the pin portion 51 in its associated opening 52. The portion 51 of the pin 50 has a hexagonal head 56 at its one end which is firmly clamped against a laterally extending lug portion 58 of the caliper member by a bolt part 60 of the pin element 50 which passes with only nominal clearance through an opening 62 in the lug 58 into screw-threaded engagement with an axial bore in the part 51 of the pin 50.

If the other pin assembly 48, which leads the pin assembly 46 in the direction of normal rotation of the disc, were identical to the pin assembly 46 difficulties would be experienced during assembly in the event of misalignment between the openings in the caliper lugs and torque member arms arising from conventional mass-production manufacturing inaccuracies. Furthermore, spreading apart of the torque member arms 16 and 18 on drag transference from the pads would cause the pins to bind in their openings and, in extreme cases, bend or fracture. The pin assembly 48 therefore differs from the pin assembly 46 in that the shank 69 of the bolt part 64 of the pin element 66 which clamps the part 67 of the pin 66 to the caliper lug 68 extends with clearance through an oversized opening 70 in the lug 68 so that the pin element 66 is capable of lateral adjustment relative to the caliper member during assembly of the brake.

An "oversized" opening in this context is one which is sufficiently greater than the diameter of the shank 69 of the bolt to accommodate the maximum lateral displacement of the pin element 66 relative to the caliper member 10 which occurs as a result of misalignment or of spreading of the torque member arms 16 and 18, without engagement of the shank 69 of the pin element 66 with the wall of that oversized opening. The bolt part 64 has a shoulder 71 which abuts against the hexagonal head 72 of the part 67 of the pin element 66 to limit penetration of the bolt part into the part 67 and leave an axial spacing between the lug 68 and the head of the bolt part 64. A coil spring 74 surrounds the shank 69 of the bolt part 64 and is loaded under compression between the lug 68 and the head of the bolt part 64 so as to clamp the laterally extending surface 73 on the hexagonal head 72 of the bolt part 64 against the laterally extending surface 75 on the other side of the lug 68.

Like the part 51 of the pin element 50, the part 67 of the pin 66 is slidably received in a complementary opening 76 in the torque member and is retained in the opening 76 by a flexible sealing boot 78. It is desirable that the holes 76 and 52 should be a snug sliding fit on the pin parts 67 and 51 and should not be oversized, so as to properly locate the caliper against tipping and other movements that could occur under vibration.

During assembly of the brake, any misalignment appearing between the openings 70 and 76 when the pin assembly 46 has been completed can be accommodated by lateral movement of the shank 69 of the bolt part 64 in the oversized opening 70. During braking in the forward rotation of the disc, spreading apart of the torque member arms 16 and 18 as a result of drag on the pads is accommodated by lateral displacement of the pin element 66 relative to the lug 68. Such lateral displacement is resisted by friction between the surface 73 on the hexagonal head of the pin 66 and the surface 75 on the lug 68 and between the lug 68 and spring 74 if the displacement is sufficient to cause sliding of the spring on the lug. This frictional resistance is governed by the characteristics of the spring 74 and can therefore readily be predetermined in a given disc brake. The resistance will not be dependent upon the amount of spreading of the torque member arms. The frictional resistance therefore prevents spurious rattling of the caliper within the clearance which could otherwise occur under vibration.

In one alternative arrangement (not shown) resilient means such as a coil spring is positioned between the hexagonal head of the part 67 of the pin 66 and the adjacent surface of the lug 68 so that the part 67 of the pin 66 is pulled towards the lug 68 against the latter spring by the bolt part 64 which will have its head directly or indirectly engaging the lug 68.

The frictional resistance caused by the spring 74 need only be sufficient to prevent rattling of the bolt part 64 in its oversized opening so that the resistance can be fairly small. As lateral forces tending to cause binding of the pin elements in their openings cannot be greater than the frictional resistance caused by the spring, these lateral binding forces will also be fairly small resulting in a much reduced sensitivity of the sliding characteristics of the caliper member to deformation of the brake under load.

It is apparent that, as well as accommodating any lateral misalignment of otherwise parallel pins and holes in the caliper and torque member, respectively, the aforegoing arrangement enables any angular misalignment, for example of the opening 76, which might occur in manufacture to be accommodated by angular displacement of the pin element 66 relative to the axis of the bore 70 in the associated lug 68.

Although described above as being of nominal value, the clearance between the shank of the bolt part 60 and the opening 62 in the lug 58 can either be a tight or a loose fit since, once the bolt 60 is tightened, no further movement between the bolt 60 and the caliper lug 58 is permitted.

Many of the known methods of seeking to overcome the problems which the present invention obviates have involved the use of out of round holes for receiving the pins. Such out of round holes are of course relatively expensive to manufacture. It will be noted in this connection that the present arrangement does not require the use of out of round holes but enables the use of conventional, cheaply manufactured round holes to be retained.

Finally, it will be noted that, although only applied to the one pin element 66 in the above-described preferred embodiment, in other embodiments, both pin elements 66 and 50 can be constructed in the manner of the present pin element 66 whose shank portion passes with clearance through its respective lug bore and carries an associated helical coil spring. Such an arrangement can be particularly useful during initial assembly of the brake.

I claim:

1. In a sliding caliper disc brake of the type comprising a torque member, a caliper member slidably mounted on the torque member for straddling a minor portion of the periphery of a rotatable disc, and an actuator for directly urging a friction pad against one side of the disc to cause the caliper member to slide relative to the torque member to apply by reaction an opposite friction pad onto the other side of the disc, the caliper member being slidably mounted on the torque member by a sliding connection which includes a pin element having a portion slidably received in one of said members, said pin element being connected to the other of said members by means permitting lateral displacement of said pin element with respect to said other of said members, the improvement comprising means defining laterally extending first friction surfaces on the pin element and on said other of said members and means axially biasing said first friction surfaces towards each other so as to provide frictional resistance to said lateral displacement, said axial biasing means comprising a metallic spring means disposed around the pin element between opposed second friction surfaces on the pin and on said other of said members, respectively, said spring means being laterally slidable in relation to said second friction surfaces in response to relative lateral displacement of the pin and said other of said members.

2. A disc brake according to claim 1 wherein said second friction surfaces on the pin and on the other of said members lie in respective parallel planes which extend perpendicularly to the longitudinal axis of the pin.

3. A disc brake according to claim 1 wherein the metallic spring means comprises a helical coil spring.

4. A sliding caliper disc brake comprising a torque member, a caliper member slidably mounted on the torque member for straddling a minor portion of the periphery of a rotatable disc, and an actuator for directly urging a friction paid against one side of the disc to cause the caliper member to slide relative to the torque member to apply by reaction an opposite friction pad onto the other side of the disc, the caliper member being slidably mounted on the torque member by a sliding connection which includes a pin element having a portion slidably received in one of said members, the friction pads being mounted on the torque member so that drag experienced by the pads, when they are applied to the rotating disc in use of the brake, is transmitted directly to the torque member and does not apply a lateral load to the sliding connection between the caliper and torque members, said pin element being connected to the other of said members by means permitting lateral displacement of said pin element with respect to said other of said members, said pin element comprising a first part carrying said portion which is slidably received in said one of the members and a second part in the form of a headed bolt which extends axially from one end of said first part and has a shank portion which extends through an oversized opening in a laterally projecting lug portion of said other of said members, laterally extending first friction surfaces on said pin element and on said other of said members and means axially biasing said first friction surfaces towards each other so as to provide frictional resistance to said lateral displacement, and in which said one end of the first part of said pin element defines said laterally extending first friction surface on the pin element, and one side surface of said lug portion defines said laterally extending first friction surface on said other of said members, said axial biasing means being effective between the other side surface of said lug portion and the head of said bolt to axially bias said laterally extending friction surfaces into frictional engagement and comprising a metallic spring means disposed around the pin element between opposed second friction surfaces on the pin and on said other of said members, respectively, said spring means being laterally slidable in relation to said second friction surfaces in response to relative lateral displacement of the pin and said other of said members.

5. A sliding caliper disc brake comprising a torque member, a caliper member slidably mounted on the torque member for straddling a minor portion of the periphery of a rotatable disc, and an actuator for directly urging a friction pad against one side of the disc to cause the caliper member to slide relative to the torque member to apply by reaction an opposite friction pad onto the other side of the disc, the caliper member being slidably mounted on the torque member by a sliding connection which includes a first pin element having a portion slidably received in one of said members, and a second pin element which is slidable in one of said members and which is secured to the other member against lateral displacement relative thereto, said first pin element being connected to the other of said members by means permitting lateral displacement of said first pin element with respect to said other of said members, laterally extending first friction surfaces on said first pin element and on said other of said members and means axially biassing said first friction surfaces towards each other so as to provide frictional resistance to said lateral displacement said axial biassing means comprising a metallic spring means disposed around the pin element between opposed second friction surfaces on the pin and on said other of said members, respectively, said spring means being laterally slidable in relation to said second friction surfaces in response to relative lateral displacement of the pin and said other of said members.

6. A sliding caliper disc brake comprising a torque member, a caliper member slidably mounted on the torque member for straddling a minor portion of the periphery of a rotatable disc, and an actuator for directly urging a friction pad against one side of the disc to cause the caliper member to slide relative to the torque member to apply by reaction an opposite friction pad onto the other side of the disc, the caliper member being slidably mounted on the torque member by a sliding connection which includes a first pin element having a portion slidably received in one of said members, and a second pin element which is slidable in one of said members and which is secured to the other member against lateral displacement relative thereto, the sliding surfaces of the pin elements and their complementary openings in said one member being protected against the ingress of dirt and moisture by sealing means which retain the pin elements in their openings even when the connection between the pin elements and said other members is partially or completely dismantled, said first pin element being connected to the other of said members by means permitting lateral displacement of said first pin element with respect to said other of said members, laterally extending first friction surfaces on said first pin element and on said other of said members and means axially biassing said first friction surfaces towards each other so as to provide frictional resistance to said lateral displacement, said axial biassing means comprising a metallic spring means disposed around the pin element between opposed second friction surfaces on the pin and on said other of said members, respectively, said spring means being laterally slidable in relation to said second friction surfaces in response to relative lateral displacement of the pin and said other of said members.

* * * * *